United States Patent
de Vito et al.

(10) Patent No.: US 6,459,794 B1
(45) Date of Patent: Oct. 1, 2002

(54) PROCESS FOR SCRAMBLING AND PROCESS FOR DESCRAMBLING DIGITAL VIDEO DATA AND DEVICES IMPLEMENTING THE PROCESSES

(75) Inventors: Mario de Vito, Gevèze; Jean-Bernard Fischer, Le Kremlin-Bicêtre; Véronique Pla, Rennes, all of (FR)

(73) Assignee: Thomson Licensing S.A., Boulogne-Cedex (FR)

( * ) Notice: Subject to any disclaimer, the term of this patent is extended or adjusted under 35 U.S.C. 154(b) by 0 days.

(21) Appl. No.: 09/197,152

(22) Filed: Nov. 20, 1998

(30) Foreign Application Priority Data

Nov. 26, 1997 (FR) ............................................ 97 14844

(51) Int. Cl.$^7$ ................................................ H04L 9/00
(52) U.S. Cl. ....................... 380/210; 380/205; 380/211; 380/268; 380/281
(58) Field of Search ................................ 380/205, 210, 380/211, 268, 281

(56) References Cited

U.S. PATENT DOCUMENTS

| 5,854,840 | A | * 12/1998 | Cannella, Jr. ................... 380/9 |
| 6,035,044 | A | * 3/2000 | Itoi .............................. 380/210 |
| 6,097,816 | A | * 8/2000 | Momiki et al. ............. 380/210 |

FOREIGN PATENT DOCUMENTS

| EP | 0359729 A | 3/1990 | ............. G09C/5/00 |
| EP | 0619677 A | 10/1994 | ............. H04N/5/92 |
| EP | 0633703 A | 1/1995 | ............. H04N/9/80 |
| EP | 0648055 A | 4/1995 | .......... H04N/7/167 |
| EP | 0674441 A | 9/1995 | .......... H04N/7/167 |

OTHER PUBLICATIONS

Thomas Sikora, Heinrich–Hertz–Intitut Berlin, Image Processing Department, wwwam.hhi.de/mpeg–video/papers/sikora/mpeg1_2/mpeg1_2.htm, Jun. 9, 1997.*
Harrick M. Vin et al., "Efficient Failure Recovery in Multi–Disk Multimedia Servers", 25th International Symposium on Fault Tolerant Computing Digest of Papers, Pasedena, CA, Jun. 27–30, 1995, No. Symp. 25, Jun. 27, 1995, IEEE.
French Search Report dated Jul. 10, 1998.

* cited by examiner

*Primary Examiner*—Albert DeCady
*Assistant Examiner*—Todd Jack
(74) *Attorney, Agent, or Firm*—J. S. Tripoli; R. D. Shedd; D. T. Shoneman

(57) ABSTRACT

The invention relates to a process for scrambling video data in the MPEG2 video format as well as to a process for descrambling data scrambled according to the process of the invention.

The scrambled video data are the coefficients AC and/or DC arising from the "discrete cosine transform" operation which are associated with at least one block of at least one image coded in INTRA mode.

The invention applies to conditional access systems such as, for example, pay television systems.

9 Claims, 2 Drawing Sheets

PROCESS FOR SCRAMBLING AND PROCESS FOR DESCRAMBLING DIGITAL VIDEO DATA AND DEVICES IMPLEMENTING THE PROCESSES

FIELD OF THE INVENTION

The present invention relates to a process for scrambling digital video data as well as to a process for descrambling digital video data scrambled according to the scrambling process of the invention.

The invention applies more particularly to conditional access systems for which the video data are formatted according to the MPEG2 video standard and conveyed according to the MPEG2 System transport standard.

By way of non-limiting example, a conditional access system such as the one mentioned above can be a pay television system broadcasting scrambled programmes.

BACKGROUND OF THE INVENTION

As is known to the person skilled in the art, within the context of a conditional access system operating according to the MPEG2 standard, the video data are scrambled in such a way that, after scrambling, they no longer comply with the MPEG2 video standard.

In the case in which the user receiving the scrambled programme has acquired the entitlement for descrambling the programme, the scrambled video data are descrambled so as to be restored to the MPEG2 video standard. The user's MPEG2 decoder is then able to decode the descrambled video data which it receives.

In the case in which the user has not acquired the entitlement to descramble the scrambled programme, the video data are not descramble. The user's MPEG2 decoder is then totally unable to recognize the video data. No image appears on the screen: the screen is black.

The complete absence of images prevents even a glimpse of the broadcast programme and, consequently, makes it impossible to attract the attention of any potential future subscribers to the provider distributing the programmes.

The invention does not have this drawback.

SUMMARY OF THE INVENTION

Thus, the invention relates to a process for scrambling video data in the MPEG2 video format, the video data representing at least one block of at least one image coded in INTRA mode and comprising data (AC, DC) arising from a "discrete cosine transform" operation and consisting, for each block, of a first coefficient (DC) representing the mean intensity of the pixels of the block and of at least one second coefficient (AC) representing the intensity variations between pixels of the block. The scrambling of the video data is carried out by an operation for processing the data (AC, DC) arising from the "discrete cosine transform" operation compatible with the MPEG2 video standard.

The invention also relates to a process for descrambling scrambled video data, the descrambling of the video data being performed under the action of a descrambling key. The video data are data scrambled according to the abovementioned scrambling process of the invention and the descrambling key consists of at least one of the data arising from the operation for processing the data arising from the "discrete cosine transform" operation.

The invention also relates to a device for scrambling video data in the MPEG2 video format, the video data representing at least one block of at least one image coded in INTRA mode (I) and comprising data (AC, DC) arising from a "discrete cosine transform" operation and consisting, for each block, of a first coefficient (DC) representing the mean intensity of the pixels of the block and of at least one second coefficient (AC) representing the intensity variations between pixels of the block, characterized in that it comprises means for carrying out the scrambling of the video data by an operation for processing the data (AC, DC) arising from the "discrete cosine transform" operation compatible with the MPEG2 video standard.

The invention further relates to a device for descrambling video data scrambled according to the abovementioned scrambling process of the invention, the descrambling of the video data being performed under the action of a descrambling key, characterized in that it comprises means for descrambling the video data under the action of a descrambling key consisting of at least one of the data arising from the operation for processing the data arising from the "discrete cosine transform" operation.

The invention further relates to a decoder of video data coded according to the MPEG2 video standard, comprising a device for descrambling scrambled video data, characterized in that the descrambling device is a descrambling device such as the abovementioned device according to the invention.

An advantage of the invention is that it implements a process for scrambling and a process for descrambling video data which are compatible with the MPEG2 video standard.

BRIEF DESCRIPTION OF THE DRAWINGS

Other characteristics and advantages of the invention will emerge on reading a preferred embodiment given with reference to the appended figures in which.

DESCRIPTION OF PREFERRED EMBODIMENTS

Figure 1:
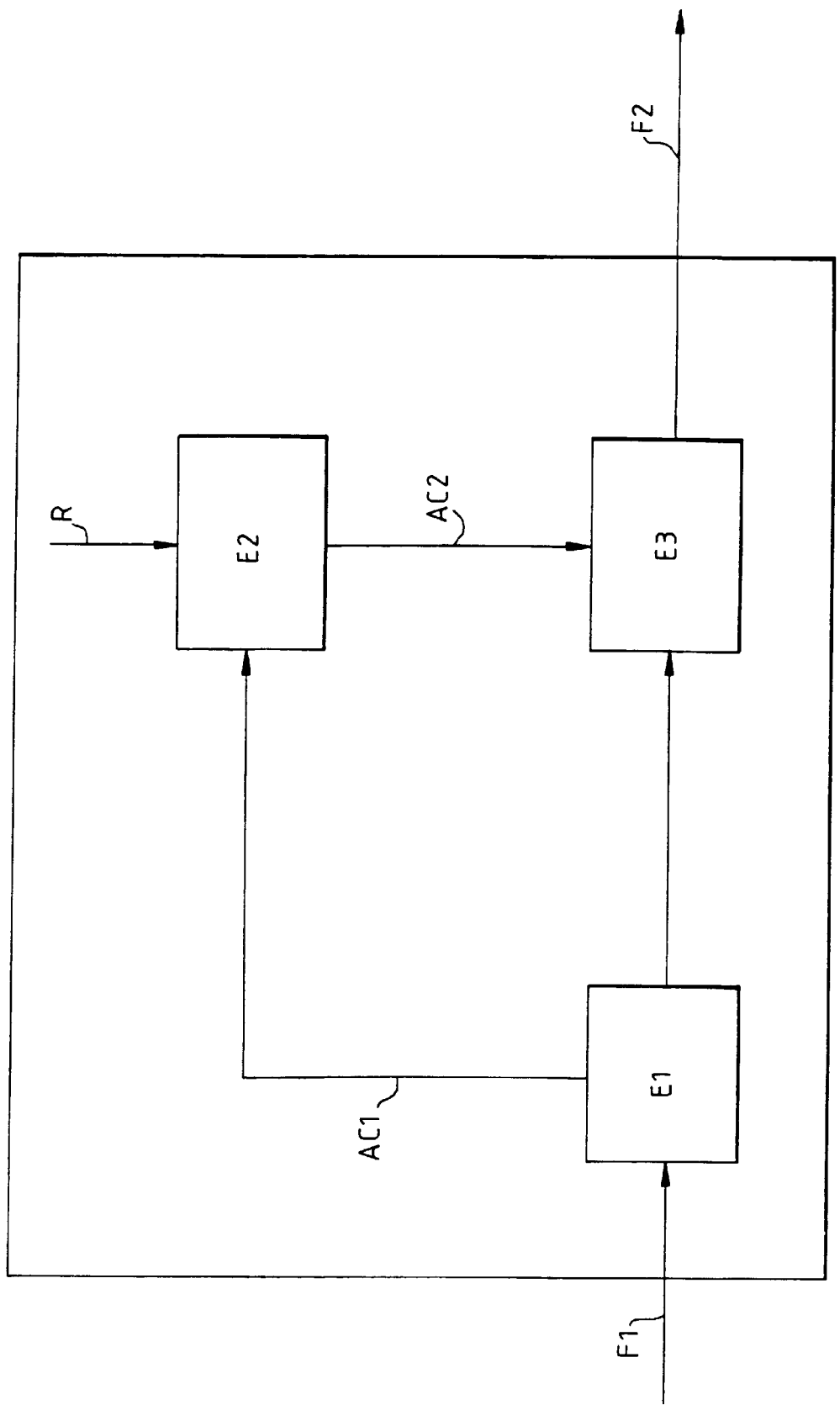
FIG. 1 represents a process for scrambling video data according to a first embodiment of the invention.

FIG. 1 represents a process for scrambling video data according to a first embodiment of the invention.

The stream F1 of data which are processed according to the process of the invention comprises a succession of packets of video data coded according to the MPEG2 video standard.

The coding according to the MPEG2 video standard uses the properties of the signal to reduce the bit rate thereof.

The coding algorithm implemented describes the images blockwise, exploiting the spatial redundancy and temporal redundancy of the images to be coded.

The spatial redundancy is evaluated, mainly, by virtue of a succession of three operations: an operation commonly referred to as "discrete cosine transform" and denoted DCT, an operation of quantizing the coefficients arising from the DCT and an operation of variable-length coding to describe the quantized coefficients arising from the DCT.

The temporal redundancy is analysed by a motion compensation operation which consists in searching, via a translation operation for each block of the current image, for the most similar block situated in a reference image. Analysis of the temporal redundancy leads to the determination of a field of translation vectors, commonly referred to as motion vectors, as well as to a prediction error which is the difference between the signal of the current image and the signal of the image predicted by motion compensation. The prediction error is then analysed according to the principle of spatial redundancy.

Coding according to the MPEG2 video standard is a coding of predictive type. It follows that the decoding procedure associated with it must be regularly reinitialized so as to protect the signal from, for example, any error of transmission or any break in signal due to the toggling of the decoder from one programme to another.

To this end, the MPEG2 video standard stipulates that, periodically, the images must be coded in spatial mode, that is to say according to a mode which exploits spatial redundancy alone. The images coded in spatial mode are commonly referred to as INTRA images or I images.

The scrambling process according to the invention is applied to the scrambling of video data corresponding to at least one block of at least one I image.

The video data which characterize an I image block contain a coefficient commonly denoted as coefficient DC (DC standing for "Direct Current") and several coefficients commonly denoted as coefficients AC (the abbreviation AC standing for "Alternating Current"). The coefficient DC represents the mean intensity of the pixels of an image block and the coefficients AC represent the intensity variations between the pixels of a block.

According to the first embodiment of the invention, for at least one block of at least one I image, the coefficients AC contained in the stream F1 and denoted AC1 in FIG. 1 are extracted from the stream F1. The extraction of the coefficients AC1 from the stream F1 is represented, symbolically, by the operation E1 in FIG. 1.

The coefficients AC1 extracted are then permuted amongst themselves in such a way as to constitute a new set AC2 of coefficients AC. Preferably, the various coefficients AC1 are permuted according to a permutation rank R which differs from a first set of successive blocks involved in the permutation of the coefficients AC to another set of blocks. However, the invention also relates to the case in which the permutation rank R is identical for all the successive blocks involved in the permutation of the coefficients AC. The permutation of the coefficients AC1 is represented, symbolically, by the operation E2 in FIG. 1.

Following the abovementioned permutation, the coefficients AC2 are substituted, within the stream F1, for the coefficients AC1 so as to constitute the data stream F2.

The operations for extracting and permuting the coefficients AC1 as well as the operation for substituting the coefficients AC2 for the coefficients AC1 are performed, for example, by programming a microprocessor.

The data stream F2 obtained after substituting for the coefficients AC1 constitutes a stream of data scrambled according to the first embodiment of the invention. In order to constitute a data stream according to the MPEG2 System standard, the video data as scrambled are multiplexed, in a manner known per se, with audio data according to the MPEC2 audio standard and with data relating to various items of information concerning the programmes distributed.

An advantage of the invention is that it makes it possible easily to modulate the deformation of the non-descrambled images received. This is because not only can the permuting of the various coefficients AC of a block be greater or lesser, but also the number of I images on which the permuting of coefficients is performed can itself also vary.

Figure 2:
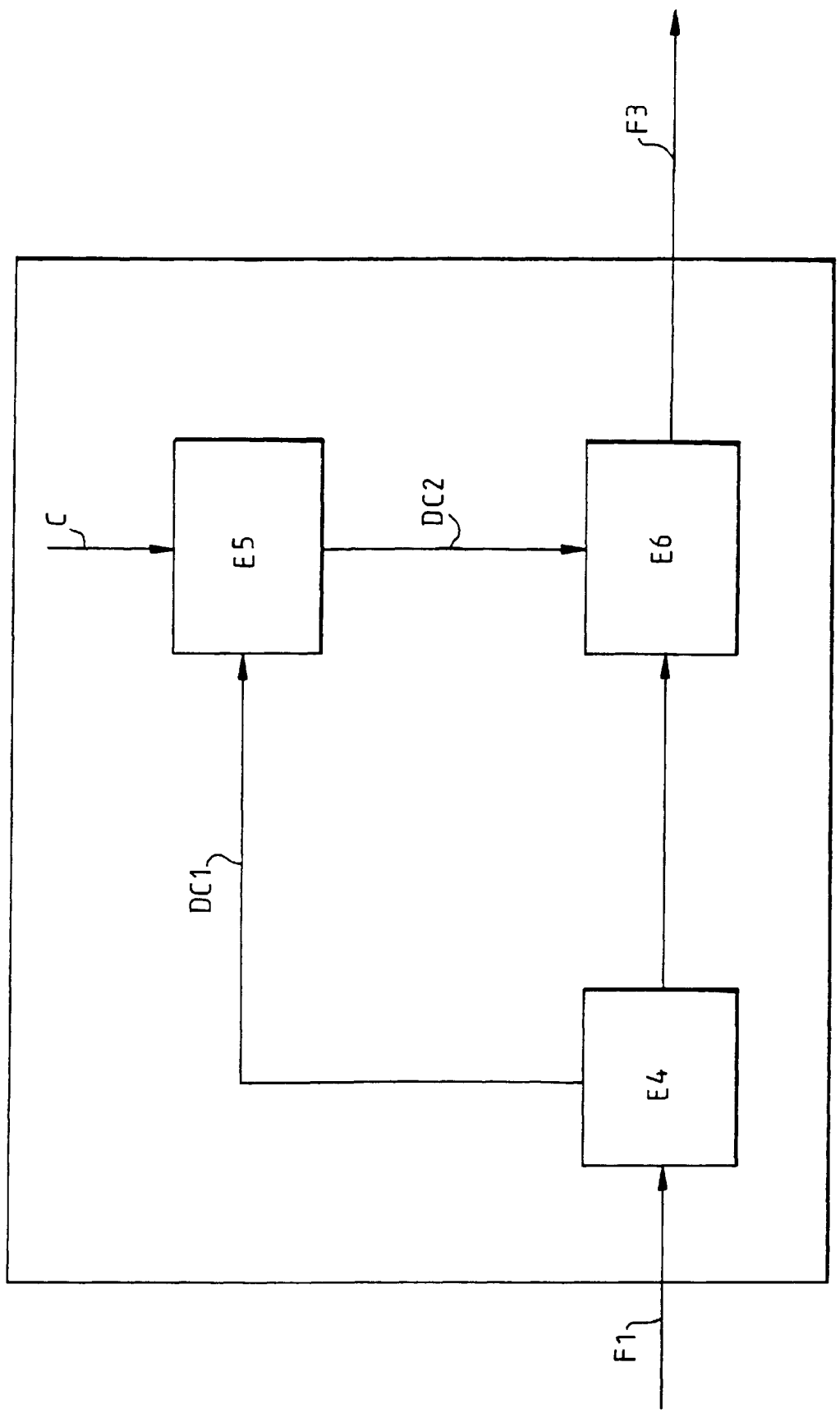
FIG. 2 represents a process for scrambling video data according to a second embodiment of the invention.

FIG. 2 represents a process for scrambling video data according to a second embodiment of the invention.

According to the embodiment represented in FIG. 2, for at least one block of at least one I image, the coefficient DC contained in the stream F1 and denoted DC1 in FIG. 2 is extracted from the stream F1. The extraction of the various coefficients DC1 is represented, symbolically, by the operation E4 in FIG. 2.

A new coefficient DC2 is then generated, under the action of a command C, from a coefficient DC1 extracted from the stream. Preferably, the command C is a random command. The new coefficients DC2 are then substituted, within the stream F1, for the coefficients DC1.

The generating of the coefficients DC2 from the coefficients DC1 as well as the substituting of the coefficients DC2 for the coefficients DC1 within the stream F1 are represented respectively by the symbolic operations E5 and E6 in FIG. 2.

The operations for extracting the coefficients DC1, for generating coefficients DC2 under the action of a command C and for substituting the coefficients DC2 generated for the coefficients DC1 are performed, for example, by microprocessor.

The data stream F3 obtained after substituting for the coefficients DC1 constitutes a scrambled data stream. In order to constitute a data stream according to the MPEG2 System standard, the video data as scrambled are multiplexed with audio data according to the MPEG2 audio standard and with data relating to various items of information concerning the programmes distributed.

According to this second embodiment of the invention, it is also advantageously possible easily to modulate the deformation of the non-descrambled images received. This is because, here again, the larger the number of I images on which the substitutions of coefficients DC are performed, the more the image received is deformed.

Advantageously, the two scrambling processes described in FIGS. 1 and 2 are not exclusive of one another. Thus, a third scrambling process according to the invention relates to a process implementing both the process described in FIG. 1 and the process described in FIG. 2. According to this third embodiment of the invention, one and the same block for which the coefficients AC are permuted may or may not have another coefficient substituted for the coefficient DC.

As mentioned earlier, the invention relates also to a process for descrambling video data scrambled according to the scrambling process described in FIG. 1 and/or the scrambling process described in FIG. 2.

In order to implement the descrambling of the video data scrambled according to the process described in FIG. 1, the successive permutation ranks R of the coefficients AC1 of the various blocks involved in the permutation are transmitted to the descrambling device. The successive permutation ranks R are then the keys for descrambling scrambled data.

Preferably, the successive permutation ranks R are transmitted to the descrambling device after having been encrypted according to an algorithm with key K. The transmission of the permutation ranks R is preferably performed in the stream which contains the scrambled video data.

In order to implement the descrambling of the video data scrambled according to the process described in FIG. 2, it is the coefficients DC1 which are transmitted as descrambling keys to the descrambling device.

Preferably, the various coefficients DC1 are transmitted to the descrambling device after having been encrypted by an algorithm with key K. The transmission of the coefficients DC1 is preferably performed in the stream of data which contains the scrambled video data.

In the case in which the scrambling process implements a process according to FIG. 1 and a process according to FIG. 2 as mentioned above, a descrambling key consists either of a permutation rank R, or of a coefficient DC1, or of the combination of a permutation rank R and a coefficient DC1.

Irrespective of the way in which the data have been scrambled, namely a process according to FIG. 1, a process according to FIG. 2, or else a process according to FIGS. 1 and 2, the data are descrambled, under the action of descrambling keys, by operations which are the inverse of the operations which served to scramble the data. These inverse operations are performed, for example, by programming a microprocessor.

What is claimed:

1. Process for scrambling video data in the MPEG2 video format, the video data representing at least one block of at least one image coded in INTRA mode and comprising data arising from a discrete cosine transform operation and including, for each block, a first coefficient representing the mean intensity of the pixels of the block and of a plurality of coefficients representing the intensity variations between pixels of the block, wherein said process comprises a permutation step, within at least one and the same block, according to a permutation rank, of the plurality of coefficients representing the intensity variations between pixels of the block.

2. Process for scrambling video data in the MPEG2 video format, the video data representing at least one block of at least one image coded in INTRA mode and comprising data arising from a discrete cosine transform operation and including, for each block, a first coefficient representing the mean intensity of the pixels of the block and of a plurality of coefficients representing the intensity variations between pixels of the block, wherein said process comprises a step of substituting a coefficient chosen under the action of a command for the coefficient representing the mean intensity of the pixels of the block.

3. Process according to claim 2, wherein said command is chosen randomly.

4. Process for descrambling scrambled video data under the action of a descrambling key, wherein said video data are data scrambled according to the process of claim 1; and wherein said process comprises a step of receiving the descrambling key including the rank of the permutation of the coefficients, representing the intensity variations between pixels of the block.

5. Process for descrambling scrambled video data under the action of a descrambling key, wherein said video data are data scrambled according to the process of claim 2; and wherein said process comprises a step of receiving the descrambling key including the coefficient representing the mean intensity of the pixels of the block.

6. Process according to claim 4, wherein said received descrambling key is encrypted with an additional key.

7. Process according to claim 5, wherein said received descrambling key is encrypted with an additional key.

8. A method for scrambling MPEG data comprising the steps of:

extracting a plurality of coefficients corresponding to intensity variations between pixels of an image block of the MPEG data;

transforming the plurality of coefficients into a second plurality of coefficients; and, inserting the second plurality of coefficients back into the image block of MPEG data.

9. A method for scrambling MPEG data comprising the steps of:

extracting a coefficient corresponding to a mean intensity of pixels of an image block of the MPEG data;

transforming the coefficient into a second coefficient; and, inserting the second coefficient back into the image block of MPEG data.

* * * * *